April 17, 1934.         A. H. STRONG         1,955,612
REFRIGERATING APPARATUS
Original Filed Oct. 7, 1930     2 Sheets-Sheet 1
FIG. I.
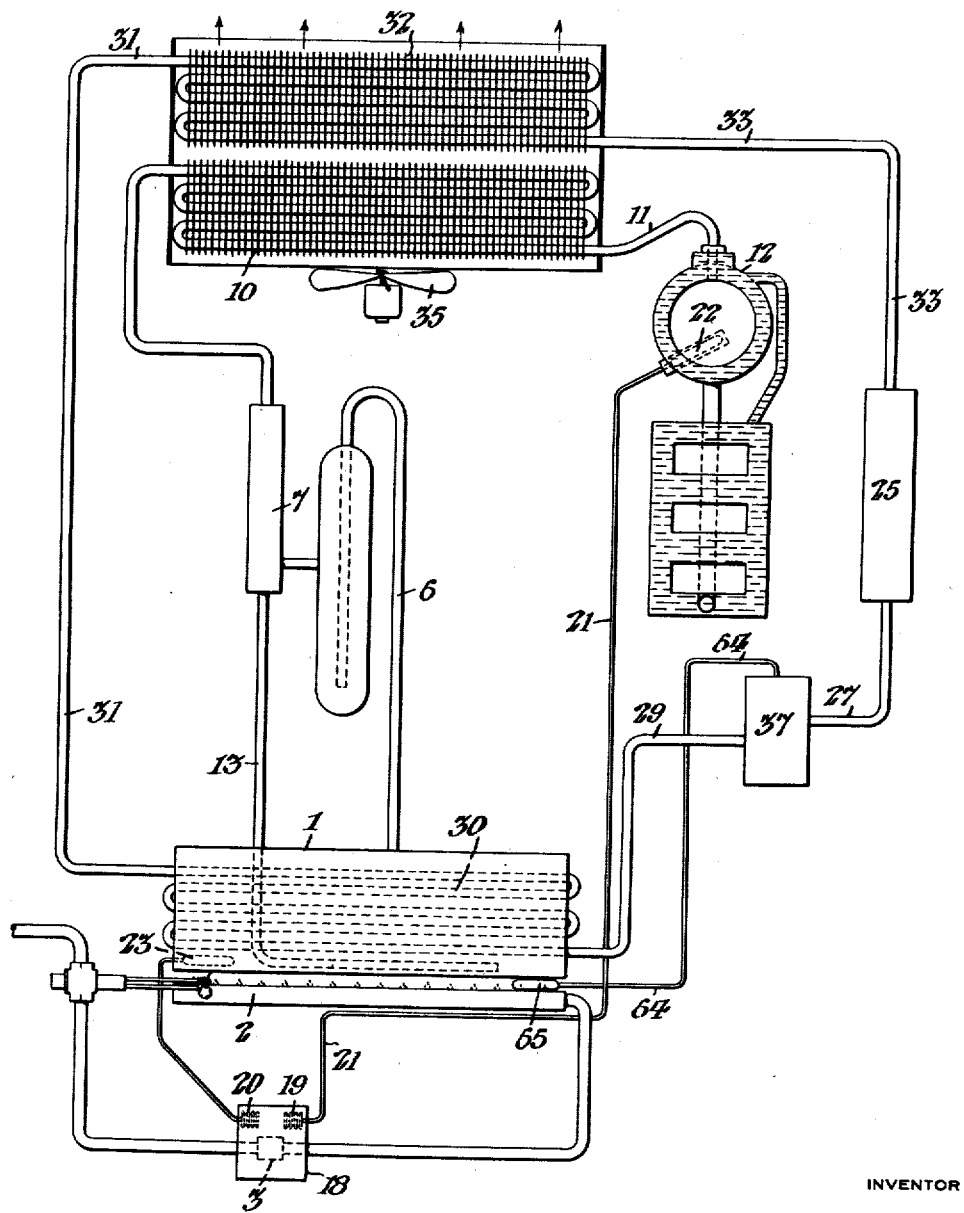
INVENTOR
ARCHIE HUGH STRONG,
BY
ATTORNEY

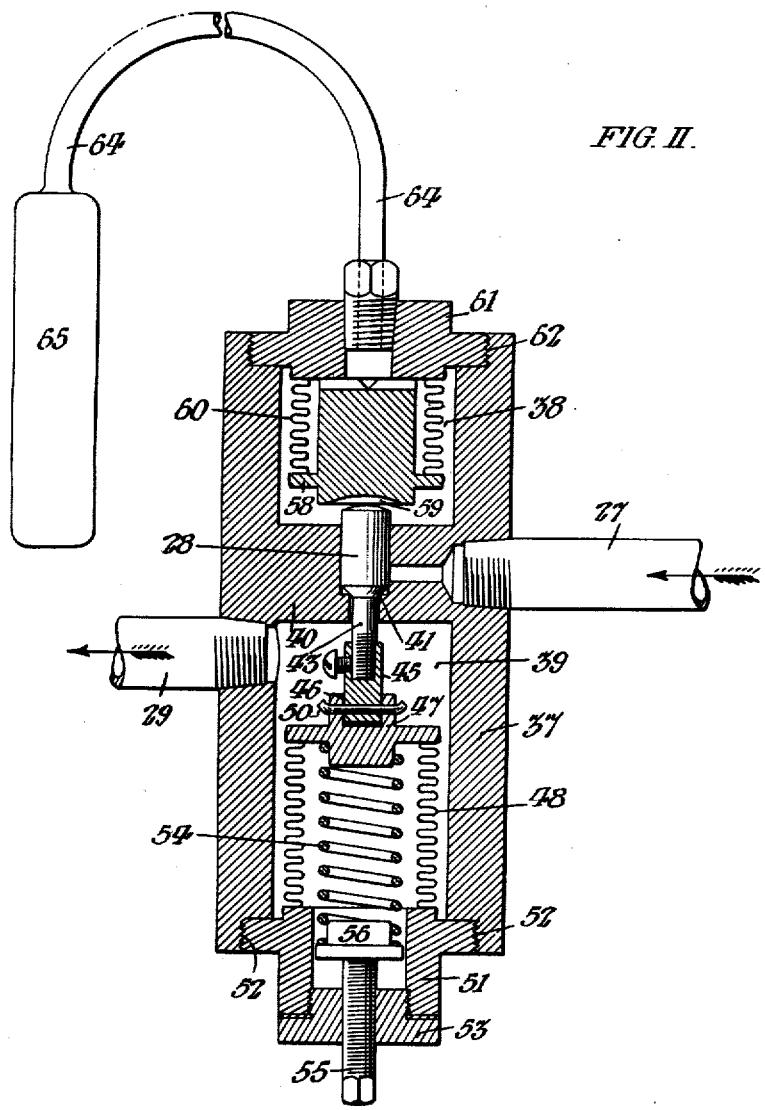

Patented Apr. 17, 1934

1,955,612

UNITED STATES PATENT OFFICE 1,955,612

REFRIGERATING APPARATUS

Archie Hugh Strong, Conshohocken, Pa., assignor to Master Domestic Refrigerating Company, Inc., Conshohocken, Pa., a corporation of New York Original application October 7, 1930, Serial No. 486,879. Divided and this application August 14, 1931, Serial No. 557,070

2 Claims. (Cl. 62—5)

This is a division of my original application Serial No. 486,879 filed October 7, 1930, now matured into Patent No. 1,913,297, patented June 6, 1933, for Letters Patent of the United States for Improvement in refrigerating apparatus.

My invention relates to refrigerating systems of the type claimed in my copending applications for Letters Patent of the United States for Improvement in refrigerating systems, respectively Serial No. 368,791 filed June 6, 1929, now matured into Patent No. 1,884,352, patented Oct. 25, 1932, and Serial No. 473,922 filed August 8, 1930, now matured into Patent No. 1,884,353, patented Oct. 25, 1932, including a circulating system for a main refrigerant, such as ammonia, and an auxiliary circulating system solely for an auxiliary refrigerant such as ethyl chloride, for cooling the ammonia generator after each interval in which said generator is heated.

In the system shown in said copending application Serial No. 473,922, the circulation of the ethyl chloride is controlled by two separate and distinct valves which are included in different places in the conduit thru which the auxiliary refrigerant is circulated and respectively adapted to adjustably limit the normal working pressure in that circuit and to automatically stop the flow of the auxiliary refrigerant in that circuit whenever the generator is being heated to generate ammonia in the main refrigerant circuit.

The essential feature of my present invention is a single valve so constructed and arranged as to be capable of performing the functions of the two separate and distinct valves aforesaid, with consequent economy in cost of construction and installation and maintenance of the same. In that embodiment, a single valve, adapted to close a single port, is adapted to be moved to close that port at either a critical temperature or a critical pressure in the system in which the valve is included, such critical temperature and pressure being variable by the adjustment of spring stress upon the valve tending to open it in opposition to said means for closing it.

However, my invention is adapted for use in any embodiment wherein it is desired to control the passage of a fluid by a single valve, in accordance with changes in both the temperature and pressure to which the valve is subjected.

My invention includes the various novel features of construction and arrangement hereinafter more definitely specified. The specific construction of the single valve herein disclosed is claimed in my original application Serial No. 486,879 aforesaid.

In said drawings; Fig. I is a diagrammatic elevation of a refrigerating system, comprising a main refrigerant circulating system of the absorption type including a generator, and a secondary refrigerant circulating system for cooling said generator in the intervals between heating operations thereof, similar to that disclosed and claimed in said copending application Serial No. 473,922, except that my improved single valve structure is substituted for the two separated valves aforesaid.

Fig. II is a vertical sectional view of said single valve indicated in Fig. I, and showing the internal construction and arrangement of said valve and its appurtenances, on a larger scale.

In said drawings; the main refrigerant generator 1 is arranged to be intermittently heated by the gas burner 2 controlled by the valve 3. Said generator 1 is part of a closed circulatory system for the main refrigerant, for instance, aqua ammonia, and includes the conduit 6 leading thru the rectifier 7 to the condenser 10, and the conduit 11 leading to the evaporator 12 in the inclosure to be refrigerated. The purpose and effect of said rectifier is to separate any entrained liquid from the vapor of the main refrigerant so that it may be returned to said generator, thru the conduit 13.

Said burner control valve 3 is arranged to be opened or closed thru mechanism in the casing 18 under control of alternately expansible devices 19 and 20, for instance, corrugated metal bellows; said bellows 19 being operatively connected, by the conduit 21, with the thermostatic bulb 22 which is subject to the temperature of the main refrigerant, conveniently in the evaporator 12; so that said burner valve 3 is opened to heat the generator 1 when said bulb 22 reaches a predetermined temperature which is relatively high for the refrigerated inclosure. Said bellows 20 is operatively connected with the thermostatic bulb 23 in the generator 1, so that said burner valve 3 is closed when said bulb 23 reaches a predetermined temperature which is relatively high for the contents of said generator.

For the sole purpose of cooling the contents of said generator 1 between successive heating operations thereof; I provide a secondary closed circuit including the liquid trap 25 containing a secondary refrigerant having a low boiling point, for instance, ethyl chloride. Said secondary circuit includes the conduit 27 which is the refrigerant inlet to my improved valve 28 which controls the circulation of the secondary refrigerant and which has the outlet conduit 29 extending to the coil 30 in said generator 1; whereby when said valve 28 is closed, said secondary refrigerant, in a liquid state, is excluded from said coil 30 extending in said generator 1. However, said coil 30 is connected by the conduit 31 with the radiator 32 which is connected by the conduit 33 with said trap 25. When said valve 28 is opened, said secondary refrigerant may gravitate from said trap 25 into said coil 30, and be boiled by the heat which it absorbs from the hot primary refrigerant aqueous residue in said generator 1, and, being thus vaporized, said secondary refrigerant may be recondensed to the liquid state in said radiator 32, conveniently by subjecting the latter to a draft of atmospheric air from the fan 35, which also dissipates the heat from the condenser 10 in the main refrigerant circuit.

As shown in Fig. II; said valve 28 has the casing 37 with the two bellows chambers 38 and 39 in coaxial relation at respectively opposite ends thereof, separated by the partition 40 containing the valve seat 41. The secondary refrigerant inlet 27 opens thru said casing, in said partition, upon one side of said seat, and the outlet 29 for said refrigerant opens thru said casing at the opposite side of said seat; said inlet 27 and said outlet 29 being continually respectively in communication with said bellows chambers 38 and 39.

Said valve 28 has the screw threaded stem 43 extending thru said seat 41 and carrying the nut 45 which extends in the recess 46 in the head 47 of the bellows 48, conveniently formed of a corrugated metal tube, and said nut is pivotally connected with said head 47 by the pin 50, so that said valve 28 may oscillate to a slight degree to fit its seat 41 when closed thereon, regardless of any slight lateral displacement of said bellows 48.

Said bellows 48 is carried by the tubular closure 51 for the lower end of said valve casing 37 and bellows chamber 39. Said closure 51 may be removably connected with said casing 37 by any convenient means, for instance the screw thread 52. Said closure 51 is internally screw threaded for engagement with the removable plug 53 which may be removed to permit the insertion and removal of the spring 54 which bears at its upper end against said bellows head 47 and is adapted to stress and extend said bellows to open said valve 28. The effective stress of said spring 54 is adjustably variable by the spring abutment screw 55 which extends axially thru said plug 53 and carries the spring abutment 56 for the lower end of said spring.

Said valve 28 is thus adapted to be closed upon its seat by the pressure of the fluid which it controls being effective upon said bellows 48 in the chamber 39 to collapse said bellows at a pressure which is adjustably variable in accordance with the stress of said spring 54; such pressure being attained, in the embodiment shown, by the absorption of heat from the contents of the generator 1 and consequent expansion of said secondary refrigerant.

The bellows head 58 in said chamber 38 has the recess 59 adapted to contact with and shift said valve 28 to close it, but may stand in spaced relation with said valve, as indicated in Fig. II, when said valve is closed by the collapse of said bellows 48, as shown in said figure. The bellows 60, conveniently formed of a corrugated metal tube, like the bellows 48, connects said head 58 with the closure 61 for the bellows chamber 38 and the upper end of said casing 37. Said closure 61 may be removably connected with said casing by any convenient means, for instance, the screw thread 62. Said closure 61 is connected with the conduit 64 which opens therethru into the interior of said bellows 60 and has at its opposite end the bulb 65 which may be located anywhere it may be subjected to the heat from the burner 2 or to a burner operative simultaneously with said burner 2, as in my application Serial No. 473,992, aforesaid. Said bellows 60, conduit 64, and bulb 65 may be charged with any fluid readily responsive to changes of temperature, as alcohol or atmospheric air, and the effect of such construction and arrangement is to close said valve 28 and stop the circulation of the secondary refrigerant past said valve, at a predetermined temperature; regardless of the fact that the pressure of the secondary refrigerant upon said bellows 48 and its appurtenances may then be insufficient to close said valve 28.

My improved valve structure shown in Fig. II is thus adapted to close said valve 28 and stop the circulation of fluid past it at any temperature predetermined by the calibration of said bellows 60 and its appurtenances; and to close said valve at any desired pressure of the fluid controlled by it within the range of adjustment of said spring 54. Thus, in the embodiment shown, the valve structure shown in Fig. II is effective to stop the circulation of the secondary refrigerant through the coil 30 in the generator whenever it is desired to subject the latter to the heating operation of the burner 2, and the bellows 48 and its appurtenances are effective to stop the circulation of the secondary refrigerant whenever the secondary refrigerant has reached a critical pressure, for which said bellows 48 had been calibrated by stress of the spring 54, and said secondary refrigerant has become heated to such a degree as to render it desirable to cool it, by dissipating heat from it at the radiator 32. However, the spring 54 and its appurtenances would be equally effective to stop the circulation of the secondary refrigerant if and when the pressure thereof for which it is calibrated is attained by any other means, for instance by compressing said refrigerant with a pump.

Moreover, altho I do not show in Fig. II any means for varying the effective pressure upon said bellows head 58 except means for heating the fluid contents of said bellows and its appurtenant conduit 64 and bulb 65; of course, the temperature at which the expansion of said bellows is effective to close said valve 28 may also be adjustably determined by variation of the stress of said spring 54, by said screw 55; for, any increment in the resistance to closure of said valve 28 would require an increment in pressure of the fluid in said bellows 60, and consequent increment in temperature of that fluid, to close said valve.

Therefore, I do not desire to limit myself to the precise details of construction and arrangement herein set forth, as it is obvious that various modifications may be made therein without departing from the essential features of my invention, as defined in the appended claims.

I claim:

1. In a refrigerating apparatus, the combination with a main refrigerating circuit including a generator, a condenser, and an evaporator; of heating means in cooperative relation with said generator; an auxiliary refrigerant circuit including a portion in cooperative relation with said generator, and containing a refrigerant having a boiling point lower than the contents of said generator at any time during the operation of the system; and a single valve having automatically operative means adapted to limit the pressure at which said auxiliary refrigerant is permitted to circulate thru said valve, and to stop the circulation of said auxiliary refrigerant thru said valve when the generator is being heated, wherein the valve includes a casing containing two corrugated metal bellows; means adjustably connecting said valve with one of said bellows; a spring in that bellows tending to open said valve; screw means adjustable in said casing to vary the stress of said spring upon said valve; an inlet and an outlet port in said casing for said auxiliary refrigerant; whereby that bellows and its spring are continually subjected to the pressure of said refrigerant when said valve is open; so that said valve is closed by and at a predetermined pressure of said refrigerant and opened by said spring when said pressure is less; a conduit extending from the other of said bellows to a bulb in cooperative relation with the generator heating means; a thermostatic fluid in said bulb and conduit and bellows connected therewith; whereby expansion of said thermostatic fluid by said heating means distends said bellows containing it and shuts said valve.

2. In refrigerating apparatus, the combination with a main generating circuit including a generator, a condenser, and an evaporator; of heating means in cooperative relation with said generator; an auxiliary refrigerant circuit including a portion in cooperative relation with said generator; a single valve for controlling the flow of said auxiliary refrigerant in said auxiliary refrigerant circuit; a spring continually tending to open said valve; screw means adjustable to vary the stress of said spring upon said valve; and a thermostatic device in cooperative relation with said generator heating means; whereby said valve is shut, against the stress of said spring, when said thermostatic element is subjected to a predetermined temperature, at said generator.

ARCHIE HUGH STRONG.

CERTIFICATE OF CORRECTION.

Patent No. 1,955,612.

April 17, 1934.

ARCHIE HUGH STRONG.

It is hereby certified that error appears in the printed specification of the above numbered patent requiring correction as follows: Page 1, line 16, strike out the word "solely" and insert the same before "for" in line 17; page 3, line 81, claim 2, for "generating" read refrigerating; and that the said Letters Patent should be read with these corrections therein that the same may conform to the record of the case in the Patent Office.

Signed and sealed this 15th day of May, A. D. 1934.

Bryan M. Battey (Seal)

Acting Commissioner of Patents.

of the system; and a single valve having automatically operative means adapted to limit the pressure at which said auxiliary refrigerant is permitted to circulate thru said valve, and to stop the circulation of said auxiliary refrigerant thru said valve when the generator is being heated, wherein the valve includes a casing containing two corrugated metal bellows; means adjustably connecting said valve with one of said bellows; a spring in that bellows tending to open said valve; screw means adjustable in said casing to vary the stress of said spring upon said valve; an inlet and an outlet port in said casing for said auxiliary refrigerant; whereby that bellows and its spring are continually subjected to the pressure of said refrigerant when said valve is open; so that said valve is closed by and at a predetermined pressure of said refrigerant and opened by said spring when said pressure is less; a conduit extending from the other of said bellows to a bulb in cooperative relation with the generator heating means; a thermostatic fluid in said bulb and conduit and bellows connected therewith; whereby expansion of said thermostatic fluid by said heating means distends said bellows containing it and shuts said valve.

2. In refrigerating apparatus, the combination with a main generating circuit including a generator, a condenser, and an evaporator; of heating means in cooperative relation with said generator; an auxiliary refrigerant circuit including a portion in cooperative relation with said generator; a single valve for controlling the flow of said auxiliary refrigerant in said auxiliary refrigerant circuit; a spring continually tending to open said valve; screw means adjustable to vary the stress of said spring upon said valve; and a thermostatic device in cooperative relation with said generator heating means; whereby said valve is shut, against the stress of said spring, when said thermostatic element is subjected to a predetermined temperature, at said generator.

ARCHIE HUGH STRONG.

CERTIFICATE OF CORRECTION.

Patent No. 1,955,612.                                                                 April 17, 1934.

ARCHIE HUGH STRONG.

It is hereby certified that error appears in the printed specification of the above numbered patent requiring correction as follows: Page 1, line 16, strike out the word "solely" and insert the same before "for" in line 17; page 3, line 81, claim 2, for "generating" read refrigerating; and that the said Letters Patent should be read with these corrections therein that the same may conform to the record of the case in the Patent Office.

Signed and sealed this 15th day of May, A. D. 1934.

Bryan M. Battey (Seal)                                                                 Acting Commissioner of Patents.